United States Patent
Toshioka et al.

(10) Patent No.: US 7,752,838 B2
(45) Date of Patent: Jul. 13, 2010

(54) DEVICE FOR PURIFYING EXHAUST GAS OF AN INTERNAL COMBUSTION ENGINE

(75) Inventors: Shunsuke Toshioka, Susono (JP); Takamitsu Asanuma, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 498 days.

(21) Appl. No.: 11/885,153

(22) PCT Filed: Oct. 4, 2006

(86) PCT No.: PCT/JP2006/320243

§ 371 (c)(1),
(2), (4) Date: Aug. 27, 2007

(87) PCT Pub. No.: WO2007/043546

PCT Pub. Date: Apr. 19, 2007

(65) Prior Publication Data

US 2008/0314025 A1    Dec. 25, 2008

(30) Foreign Application Priority Data

Oct. 5, 2005  (JP) .............................. 2005-292164

(51) Int. Cl.
*F01N 3/00* (2006.01)
(52) U.S. Cl. .............................. 60/277; 60/285; 60/286; 60/295
(58) Field of Classification Search ........... 60/273–274, 60/284–287, 295, 299–301

See application file for complete search history.

(56) References Cited

U.S. PATENT DOCUMENTS 6,427,439 B1    8/2002    Xu et al.

FOREIGN PATENT DOCUMENTS

| EP | 0 936 349 A2 | 8/1999 |
|---|---|---|
| EP | 1 134 396 A1 | 9/2001 |
| JP | 5-113116 | 5/1993 |
| JP | 07-208151 A | 8/1995 |
| JP | 2000-337130 A | 12/2000 |
| JP | 2001-032745 A | 2/2001 |
| JP | 2004-251134 A | 9/2004 |

*Primary Examiner*—Thomas E Denion
*Assistant Examiner*—Jesse Bogue
(74) *Attorney, Agent, or Firm*—Kenyon & Kenyon LLP

(57) ABSTRACT

A device for purifying exhaust gas of an internal combustion engine comprising a NOx catalyst device, fuel feeding means for feeding additional fuel into combusted gas flowing into the NOx catalyst device during the regeneration treatment, and a NOx concentration sensor arranged on the exhaust downstream of the NOx catalyst device, wherein when the NOx concentration detected by the NOx concentration sensor is lower than a preset concentration during the regeneration treatment of this time, the amount of NOx absorbed by the NOx catalyst device during a preset period until the regeneration treatment of the next time is estimated by utilizing the NOx concentration sensor, and when the absorbed amount of NOx is smaller than a preset amount, it is decided that the amount of additional fuel fed during the regeneration processing of this time had been abnormally decreased.

4 Claims, 2 Drawing Sheets

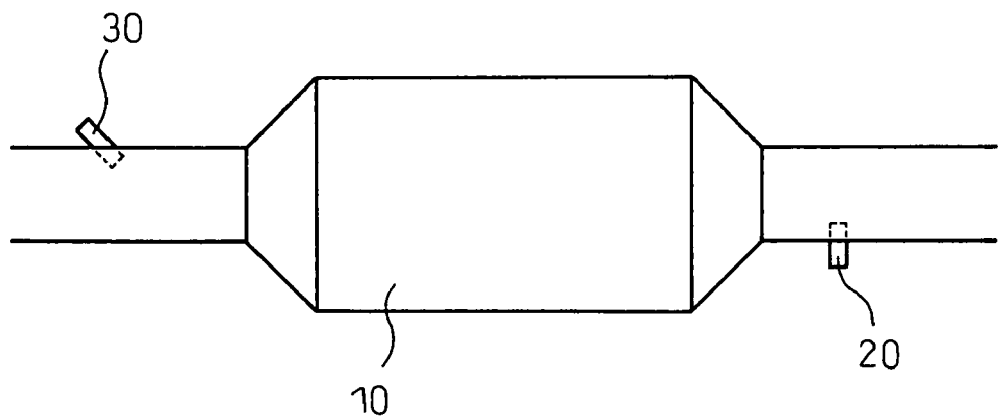
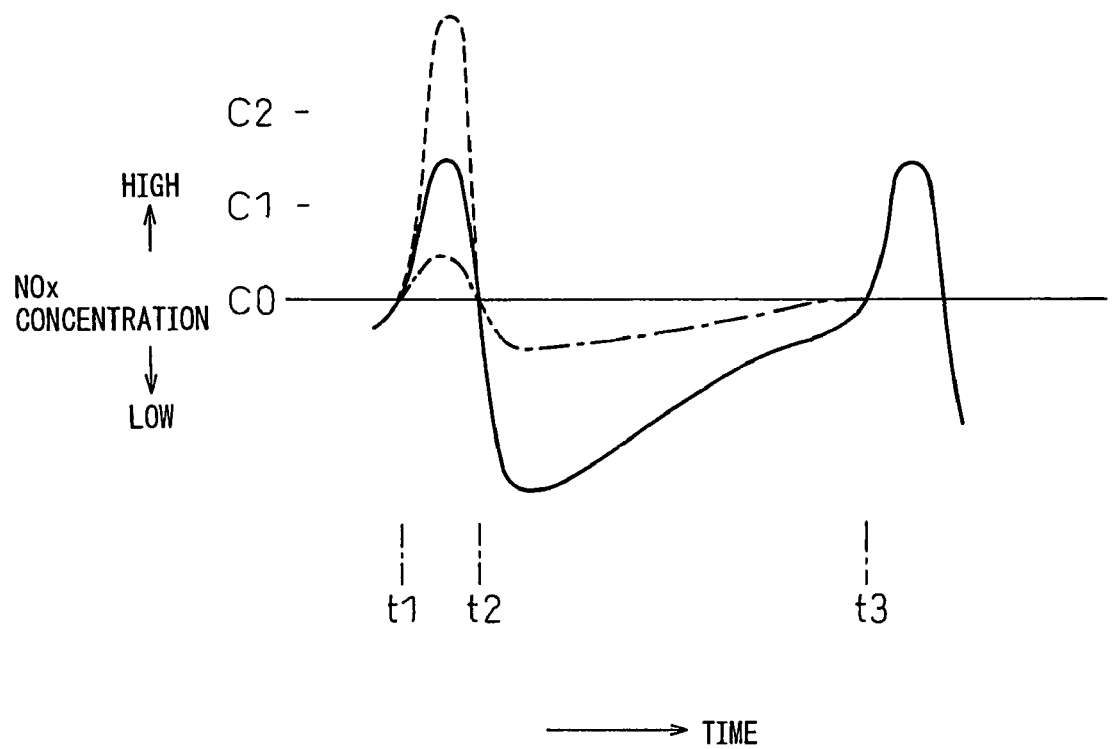

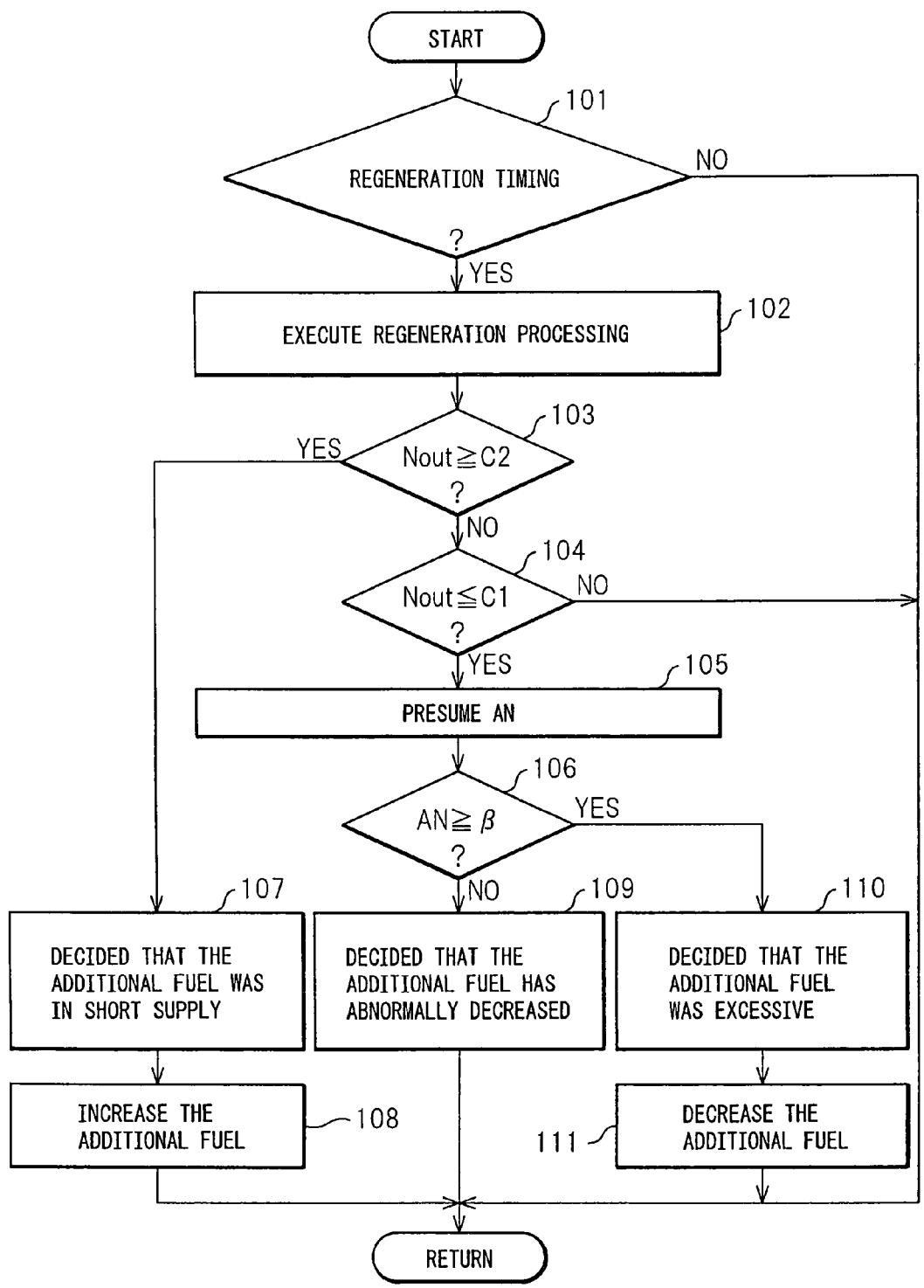

DEVICE FOR PURIFYING EXHAUST GAS OF AN INTERNAL COMBUSTION ENGINE

This is a 371 national phase application of PCT/JP2006/320243 filed 4 Oct. 2006, which claims priority of Japanese Patent Application No. 2005-292164 filed 5 Oct. 2005, the contents of which are incorporated herein by reference.

TECHNICAL FIELD

The present invention relates to a device for purifying exhaust gas of an internal combustion engine.

BACKGROUND ART

An internal combustion engine operating at a lean air-fuel ratio and having a NOx catalyst device for purifying NOx arranged in the exhaust passage thereof, has been known. The NOx catalyst device favorably absorbs NOx from the exhaust gas of an engine running under a lean air-fuel ratio of a high oxygen concentration but is not capable of absorbing NOx limitlessly. Therefore, it is necessary to regenerate the NOx catalyst device before the NOx catalyst device is saturated with NOx which has been absorbed by lowering the oxygen concentration in the combusted gas flowing into the NOx catalyst device in order to release absorbed NOx and purify the released NOx by reducing substances such as uncombusted HC and CO contained in the combusted gas.

The regeneration treatment comprises mixing additional fuel (HC) into the combusted gas of a lean air-fuel ratio in the cylinder or in the exhaust passage, and feeding them to the NOx catalyst device. Part of the additional fuel fed to the NOx catalyst device is combusted (oxidized) consuming oxygen in the combusted gas due to the oxidizing catalyst carried by the NOx catalyst device, and lowers the oxygen concentration in the combusted gas in the NOx catalyst device. The remainder of the additional fuel is used for reducing and purifying NOx released from the NOx catalyst device due to a decrease in the oxygen concentration.

Upon feeding the additional fuel in a suitable amount to the NOx catalyst device, it is possible to lower the oxygen concentration to a sufficient degree by consuming much of the oxygen in the combusted gas in the NOx catalyst device, to favorably reduce and purify NOx released from the NOx catalyst device, and to decrease the amount of fuel which passes through the NOx catalyst device to a sufficiently low level.

When additional fuel is fed in an amount larger than a suitable amount to the NOx catalyst device, the result is an increase in the amount of fuel that is neither combusted in the NOx catalyst device nor used for reducing and purifying the released NOx, i.e., an increase in the amount of fuel which simply passes through the NOx catalyst device. Thus, an increase in the amount of fuel which simply passes through the NOx catalyst device is detrimental in regard to not only fuel efficiency, but also the emission of exhaust gas.

There have been proposed devices for purifying exhaust gas of internal combustion engines by arranging a NOx concentration sensor on the downstream of the NOx catalyst device to detect the concentration of NOx flowing out from the NOx catalyst device at the time of regeneration treatment (e.g., see JP-A-5-113116 and JP-A-2004-251134). In the above devices for purifying exhaust gases, if the detected NOx concentration is lower than a preset range, then oxygen concentration has been sufficiently lowered in the combusted gas in the NOx catalyst device and NOx released in sufficient amounts can be reduced and purified to a sufficient degree. At this moment, additional fuel has been fed in an amount larger than a suitable amount; i.e., the fuel simply passes through the NOx catalyst device in a relatively large amount, and therefore, additional fuel is fed in a decreased amount in the next regeneration treatment. Further, if the NOx concentration is higher than the preset range, then the oxygen concentration has been sufficiently lowered in the combusted gas in the NOx catalyst device and NOx has been released to a sufficient degree, but could not be reduced and purified to a sufficient degree. Namely, additional fuel has been fed in an amount smaller than a suitable amount, and the amount of additional fuel is increased in the next regeneration treatment.

In the above device for purifying exhaust gas, when the concentration of NOx flowing out from the NOx catalyst device is lower than a preset range during the regeneration treatment, it is probable that the amount of additional fuel has abnormally decreased due to a defective fuel feeding device, and therefore, the oxygen concentration in the combusted gas is not lowered to a sufficient degree and NOx is not fully released. In the case of such an abnormal decrease, it is no meanless to try to decrease the amount of the additional fuel in the next regeneration treatment.

It is, therefore, an object of the present invention to provide a device for purifying exhaust gas of an internal combustion engine which is capable of deciding an abnormal decrease in the amount of the additional fuel fed during the regeneration treatment by using a NOx concentration sensor arranged on the downstream of the NOx catalyst device.

DISCLOSURE OF THE INVENTION

A device for purifying exhaust gas of an internal combustion engine of the invention described in claim 1 comprises a NOx catalyst device, fuel feeding means for feeding additional fuel into the combusted gas flowing into the NOx catalyst device during the regeneration treatment, and a NOx concentration sensor arranged on the exhaust downstream of the NOx catalyst device, wherein when the NOx concentration detected by the NOx concentration sensor is lower than a preset concentration during the regeneration treatment, the amount of NOx absorbed by the NOx catalyst device during a preset period until the regeneration treatment of the next time is estimated by utilizing the NOx concentration sensor, and when the absorbed amount of NOx is smaller than a preset amount, it is decided that the amount of the additional fuel fed during the regeneration processing of this time had been abnormally decreased.

The device for purifying exhaust gas of an internal combustion engine of the invention described in claim 2 is the device for purifying exhaust gas of an internal combustion engine described in claim 1, wherein when the absorbed amount of NOx is greater than the preset amount, it is decided that the additional fuel had been fed in an amount larger than a suitable amount in the regeneration treatment of this time.

The device for purifying exhaust gas of an internal combustion engine of the invention described in claim 3 is the device for purifying exhaust gas of an internal combustion engine described in claim 1 or 2, wherein the preset amount is varied depending upon the deteriorated state of the NOx catalyst device.

According to the device for purifying exhaust gas of an internal combustion engine of the invention described in claim 1, when the NOx concentration detected by the NOx concentration sensor is lower than the preset concentration on the exhaust downstream of the NOx catalyst during the regeneration treatment of this time, the amount of NOx absorbed by the NOx catalyst device during the preset period until the regeneration treatment of the next time is estimated by utilizing a NOx concentration sensor, and when the absorbed amount of NOx is presumed to be smaller than the preset amount, then NOx has not been released to a sufficient degree during the regeneration processing of this time and it is decided that the amount of the additional fuel fed during the regeneration processing of this time had been abnormally decreased.

According to the device for purifying exhaust gas of an internal combustion engine of the invention described in claim 2, when the absorbed amount of NOx is estimated to be greater than the preset amount in the device for purifying exhaust gas of an internal combustion engine described in claim 1, then NOx had been released to a sufficient degree in the regeneration treatment of this time and additional fuel had been fed in an amount larger than a suitable amount.

According to the device for purifying exhaust gas of an internal combustion engine of the invention described in claim 3, as the NOx catalyst deteriorates in the device for purifying exhaust gas of an internal combustion engine described in claim 1 or 2, NOx is absorbed in a decreased amount during the preset period until the regeneration processing of the next time though NOx can be released to a sufficient degree through the regeneration treatment. Therefore, the preset amount is varied depending upon the deteriorated state of the NOx catalyst device.

BRIEF DESCRIPTION OF THE DRAWINGS

FIG. 1 is a schematic view of a device for purifying exhaust gas of an internal combustion engine according to the present invention;

FIG. 2 is a time chart showing a change in the NOx concentration downstream of the NOx catalyst device; and FIG. 3 is a flowchart for deciding an abnormal decrease in the amount of the additional fuel fed during the regeneration treatment.

BEST MODE FOR CARRYING OUT THE INVENTION

FIG. 1 is a schematic view of a device for purifying exhaust gas of an internal combustion engine according to the present invention, wherein reference numeral 10 denotes a NOx catalyst device arranged in the exhaust passage. Reference numeral 20 denotes a NOx concentration sensor arranged just downstream of the NOx catalyst device 10 for detecting the concentration of NOx flowing out from the NOx catalyst device 10. Further, a fuel feeding device 30 is arranged on the exhaust upstream side of the NOx catalyst device 10 to feed fuel to the combusted gas that flows into the NOx catalyst device 10. The internal combustion engine of this embodiment is an internal combustion engine (e.g., diesel engine) which executes a lean burn, and contains NOx in relatively large amounts in the exhaust gas.

The NOx catalyst device 10 has a monolithic substrate or a pelletized substrate on which uses alumina or the like, a NOx absorbing catalyst and a noble metal catalyst like platinum Pt that will be described below are carried. Further, the NOx catalyst device 10 may be one having the NOx absorbing catalyst and the noble metal catalyst carried on the surface and in the partition walls of a particulate filter formed by using a porous material, such as cordierite permitting exhaust gas to pass through the partition walls thereof.

The NOx absorbing catalyst is at least one selected from alkali metals, such as potassium K, sodium Na, lithium Li and cesium Cs; alkaline earth metals such as barium Ba and calcium Ca; rare earth elements such as lanthanum La and yttrium Y. The NOx absorbing catalyst executes the NOx absorbing/releasing action absorbing NOx when the combusted gas flowing in has a lean air-fuel ratio, i.e., has a high oxygen concentration, and releases NOx which it has absorbed when the air-fuel ratio becomes the stoichiometric air-fuel ratio or rich, i.e., when the oxygen concentration decreases. Active oxygen is released when NOx is being absorbed or released. Active oxygen works to remove the particulate matter by oxidation without producing a luminous flame. Therefore, if the NOx catalyst device 10 is a particulate filter, the trapped particulate matter is automatically removed by oxidation.

Here, the NOx catalyst device 10 is not capable of absorbing NOx limitlessly, and therefore, must be regenerated before it is saturated with NOx which it has absorbed by enriching the air-fuel ratio of the combusted gas flowing in and releasing the absorbed NOx so as to be reduced and purified by utilizing the NOx releasing action thereof. For example, the amount of NOx emitted per unit of time under each of the engine operating conditions is stored as a map in advance, and the amount of NOx emitted under each of the engine operating conditions is regarded as the amount of NOx flowing into the NOx catalyst device 10. Then, the difference from the amount of NOx flowing out from the NOx catalyst device 10 per unit of time as calculated based on the NOx concentration detected by the NOx concentration sensor 20 becomes the amount of NOx occluded per unit of time. Therefore, an integrated value thereof can be regarded to be the amount of NOx absorbed in the NOx catalyst device 10. It is allowable, as a matter of course, to arrange the NOx concentration sensor on the exhaust upstream side of the NOx catalyst device 10, in order to calculate the amount of NOx flowing into the NOx catalyst device 10 per unit of time. The timing for regenerating the NOx catalyst device 10 is when the calculated absorbed amount of NOx has reached the setpoint. The regeneration treatment may be further executed each time the vehicle has traveled for a predetermined period of time or a predetermined distance, instead of the above regeneration timing.

In the regeneration treatment, additional fuel of a suitable amount is fed from the fuel feeding device 30 into the combusted gas of an air-fuel ratio leaner than the stoichiometric air-fuel ratio in order to enrich the air-fuel ratio of the combusted gas flowing into the NOx catalyst device 10 as desired. When the fuel feeding device 30 has not been provided, additional fuel may be injected into the combusted gas of a lean air-fuel ratio in the cylinder from the fuel injection valve that injects fuel into the cylinder in the expansion stroke or in the exhaust stroke to enrich the air-fuel ratio of the combusted gas flowing into the NOx catalyst device 10 as desired.

As a suitable amount of additional fuel is mixed and combusted gas containing a relatively large amount of oxygen flows into the NOx catalyst device 10, part of the additional fuel is combusted (oxidized) due to the oxidizing catalyst carried by the NOx catalyst device 10 consuming oxygen in the combusted gas to lower the oxygen concentration in the combusted gas. Therefore, NOx that is released from the NOx catalyst device 10 is reduced and purified by the remainder of the additional fuel, and the fuel simply passes through the NOx catalyst device 10 in only a very small amount without being burned to reduce and purify NOx.

On the other hand, if additional fuel is fed in an amount larger than a suitable amount to the NOx catalyst device, fuel in an increased amount burns in the NOx catalyst device. In this case, the fuel simply passes through the NOx catalyst device in an increased amount deteriorating not only fuel efficiency, but also the exhaust gas that is emitted.

Further, if the additional fuel is fed in only an amount smaller than a suitable amount to the NOx catalyst device, additional fuel is mostly combusted, and NOx that is released is emitted into the atmosphere without being reduced and purified to a sufficient degree.

Thus, the suitable amount of the additional fuel in the regeneration treatment is set to increase as the air-fuel ratio of the combusted gas becomes leaner, as the intake air amount (exhaust gas amount) increases or as the oxidizing ability of the NOx catalyst device 10 increases, and the operation time of the fuel feeding device 20 is controlled. However, even though the fuel feeding device is controlled for only the working time corresponding to the suitable amount depending upon the dispersion and aging in the fuel feeding characteristics of the fuel feeding device 20, it does not mean that additional fuel is fed in a suitable amount. The above problem occurs if additional fuel is fed in an amount larger than a suitable amount or smaller than a suitable amount. In this embodiment, a suitable amount of additional fuel is fed in the regeneration treatment according to the flowchart in FIG. 3.

At step 101, first, it is decided if it is the regeneration timing. The routine ends if the decision is denied. If the decision is affirmative, additional fuel is fed from the fuel feeder device 30 at step 102 to execute the regeneration treatment. The amount of additional fuel is determined by taking into consideration the air-fuel ratio (combusted air-fuel ratio) of the combusted gas just before the regeneration treatment and the intake air amount just before the regeneration treatment.

Next, at step 103, it is decided if the NOx concentration (e.g., peak value of NOx concentration) Nout flowing out from the NOx catalyst device 10 and detected by the NOx concentration sensor 20 during the regeneration treatment is higher than a second preset concentration C2. If the decision is denied, it is decided at step 104 if the NOx concentration Nout is lower than a first preset concentration C1.

FIG. 2 is a time chart showing a change in the NOx concentration detected by the NOx concentration sensor under steady engine operating. Here, C0 is the concentration of NOx flowing into the NOx catalyst device 10. If the regeneration treatment starts at a moment t1, NOx released from the NOx catalyst device 10 partly flows out from the NOx catalyst device without being reduced and purified. Therefore, the NOx concentration downstream of the NOx catalyst device 10 becomes higher than the NOx concentration C0 that is flowing into the NOx catalyst device 10.

If the peak value of NOx concentration downstream of the NOx catalyst device 10 is lying in a range between the first preset concentration C1 and the second preset concentration C2 during the regeneration processing between the moment t1 and the moment t2 as represented by a solid line, then additional fuel is added in a suitable amount during the regeneration processing and there is no problem. However, if the peak value of NOx concentration downstream of the NOx catalyst device 10 is higher than the second preset concentration C2 as represented by a dotted line, then the fuel was in short supply for sufficiently reducing and purifying NOx released from the NOx catalyst device 10.

On the other hand, if the peak value of NOx concentration downstream of the NOx catalyst device 10 is lower than the first preset concentration C1 as represented by a dot-dash chain line, then be NOx released from the NOx catalyst device 10 had been reduced and purified to more than an enough degree or NOx had been released in only a very small amount from the NOx catalyst device 10 but had not been reduced and purified.

Therefore, if the NOx concentration Nout downstream of the NOx catalyst device becomes higher than the second preset concentration C2 and the decision is affirmative at step 103, it is decided at step 107 that the additional fuel was in short supply in the regeneration treatment of this time. Namely, in the regeneration treatment of this time, additional fuel had been fed in an amount smaller than a suitable amount, and therefore, the air-fuel ratio of the combusted gas that has flown into the NOx catalyst device 10 had been enriched to only near the stoichiometric air-fuel ratio. Therefore, NOx was released from the NOx catalyst device, but was not reduced and purified to a sufficient degree, and flew out from the NOx catalyst device. At step 108, therefore, the operation time of the fuel feeding device 30 is lengthened during the regeneration treatment of the next time to increase the amount of the additional fuel.

On the other hand, if the NOx concentration Nout downstream of the NOx catalyst device becomes lower than the first preset concentration C1 and the decision is affirmative at step 104, the above-mentioned two reasons can be considered. At step 106, it is decided if the occluded amount of NOx AN after the completion of regeneration treatment of this time is larger than a preset amount B. The occluded amount of NOx may be the amount of NOx occluded by the NOx catalyst device 10 from the moment t2 of completion of the regeneration treatment of this time until the moment t3 of start of the regeneration treatment of the next time, but may further, be the absorbed amount during an arbitrarily set period between the moment t2 and the moment t3. It is desired that the thus set period starts from the moment t2.

The absorbed amount of NOx, as described above, can be presumed by taking into consideration the amount of exhaust gas per a unit time based on a difference between the concentration of NOx (e.g., C0) flowing into the NOx catalyst device 10 and the concentration of NOx flowing out from the NOx catalyst device 10. The concentration of NOx flowing into the NOx catalyst device 10 is constant if the operating condition is steady during the preset period. If the operating condition is not steady, the concentration of NOx varies in each unit time. Therefore, the absorbed amount of NOx is calculated in each unit time and is integrated.

As represented by a solid line in FIG. 2, if the difference is greater between the concentration of NOx flowing into the NOx catalyst device 10 and the concentration of NOx flowing out from the NOx catalyst device 10, and the absorbed amount of NOx AN during the preset period that is calculated is larger than the preset amount B, then it means that NOx had been released from the NOx catalyst device 10 to a sufficient degree in the regeneration treatment of this time. Therefore, the decision at step 106 becomes affirmative, and the routine proceeds to step 110 where it is decided that the additional fuel was fed excessively during the regeneration treatment of this time. In the regeneration treatment of this time as described above, the air-fuel ratio of the combusted gas that has flown into the NOx catalyst device 10 was richer than the desired rich air-fuel ratio, and NOx released from the NOx catalyst device was reduced and purified to a sufficient degree. It is, therefore, considered that the additional fuel had been fed in an amount larger than the suitable amount and the fuel of an increased amount has simply passed through the NOx catalyst device 10. Therefore, at step 111, the operation time of the fuel feeding device 30 is shortened to decrease the amount of the additional fuel in the regeneration treatment of the next time.

As represented by a dot-dash chain line in FIG. 2, on the other hand, if the difference is small between the concentration of NOx flowing into the NOx catalyst device 10 and the concentration of NOx flowing out from the NOx catalyst device 10, and the absorbed amount of NOx AN during the preset period that is calculated is smaller than the preset amount B, then NOx had not been released from the NOx catalyst device 10 to a sufficient degree in the regeneration treatment of this time. Therefore, the decision at step 106 is denied, and the routine proceeds to step 109 where it is decided that the amount of the additional fuel was abnormally decreased due to such a defect as clogging in the fuel feed port of the fuel feeding device during the regeneration treatment of this time. Therefore, in the regeneration treatment of this time, additional fuel had not been fed or had been fed in only a very small amount which was far from a suitable amount. It is therefore considered that the air-fuel ratio of the combusted gas that has flown into the NOx catalyst device 10 was still lean despite that it may have been enriched to some degree, and NOx that may have been released in small amounts from the NOx catalyst device was emitted from the NOx catalyst device 10 without being reduced and purified. In case it is decided that the amount of the additional fuel has abnormally decreased, the driver is warned to have the defective fuel feeding device repaired.

The preset amount B which is a threshold value for the occluded amount of NOx AN in the preset period, is set to increase with an increase in the preset period. Further, the NOx catalyst device 10 deteriorates as it is used for extended periods of time and absorbs NOx less. It is therefore desired to decrease the preset amount B with an increase in the period of use thereof. Further, the preset period may be a very short period of time or may be for example, instantaneous.

The invention claimed is:

1. A device for purifying exhaust gas of an internal combustion engine comprising a NOx catalyst device, fuel feeding means for feeding additional fuel into the combusted gas flowing into said NOx catalyst device during the regeneration treatment, and a NOx concentration sensor arranged on the exhaust downstream of said NOx catalyst device, wherein when the NOx concentration detected by said NOx concentration sensor is lower than a preset concentration during the regeneration treatment of this time, the amount of NOx absorbed by said NOx catalyst device during a preset period until the regeneration treatment of the next time is presumed by utilizing said NOx concentration sensor and, when said absorbed amount of NOx is smaller than a preset amount, it is decided that the amount of the additional fuel fed during the regeneration processing of this time had been abnormally decreased.

2. The device for purifying exhaust gas of an internal combustion engine according to claim 1, wherein when said absorbed amount of NOx is greater than said preset amount, it is decided that the additional fuel had been fed in an amount larger than a suitable amount in the regeneration treatment of this time.

3. The device for purifying exhaust gas of an internal combustion engine according to claim 1, wherein said preset amount is varied depending upon the deteriorated state of said NOx catalyst device.

4. The device for purifying exhaust gas of an internal combustion engine according to claim 2, wherein said preset amount is varied depending upon the deteriorated state of said NOx catalyst device.

* * * * *